US012701283B2

(12) United States Patent

Mick, Jr. et al.

(10) Patent No.: US 12,701,283 B2
(45) Date of Patent: Aug. 4, 2026

(54) SYSTEMS AND METHODS OF MODIFYING MANIFESTS FOR APPLICATIONS

(71) Applicant: ActiveVideo Networks, LLC, San Jose, CA (US)

(72) Inventors: John R. Mick, Jr., Denver, CO (US); Benjamin Phillip Hollin, Mountain View, CA (US)

(73) Assignee: ActiveVideo Networks, LLC, San Jose, CA (US)

( * ) Notice: Subject to any disclaimer, the term of this patent is extended or adjusted under 35 U.S.C. 154(b) by 0 days.

(21) Appl. No.: 18/577,996

(22) PCT Filed: Jul. 22, 2022

(86) PCT No.: PCT/US2022/037973
§ 371 (c)(1),
(2) Date: Jan. 9, 2024

(87) PCT Pub. No.: WO2023/004095
PCT Pub. Date: Jan. 26, 2023

(65) Prior Publication Data
US 2024/0323470 A1 Sep. 26, 2024

Related U.S. Application Data

(60) Provisional application No. 63/225,394, filed on Jul. 23, 2021.

(51) Int. Cl.
*H04N 21/2747* (2011.01)
*H04N 21/2343* (2011.01)
(Continued)

(52) U.S. Cl.
CPC ..... *H04N 21/2747* (2013.01); *H04N 21/2343* (2013.01); *H04N 21/25808* (2013.01);
(Continued)

(58) Field of Classification Search
CPC ......... H04N 21/2747; H04N 21/25808; H04N 21/266; H04N 21/44213
See application file for complete search history.

(56) References Cited

U.S. PATENT DOCUMENTS

| | | | | |
|---|---|---|---|---|
| 9,509,742 B2 * | 11/2016 | Gordon | .............. | H04N 21/8456 |
| 2015/0074232 A1 * | 3/2015 | Phillips | ................. | H04L 65/764 |
| | | | | 709/219 |

(Continued)

OTHER PUBLICATIONS

ActiveVideo Networks, Inc., International Search Report and Written Opinion, PCT/US2022/037973, Dec. 13, 2022, 15 pgs.

*Primary Examiner* — Mulugeta Mengesha
(74) *Attorney, Agent, or Firm* — Chernoff, Vilhauer, McClung & Stenzel, LLP

(57) ABSTRACT

A server system transmits from an application executing on a virtual client device, through a remote physical client device, a request for a manifest. The server system receives, a manifest received by, and forwarded from, the remote physical client device. The server system determines whether the server system is authorized to modify the received manifest. In response to determining that the server system is authorized to modify the received manifest, the server system requests additional content to modify the received manifest. The server system modifies listed content in the received manifest to generate an updated manifest. The server system sends the updated manifest to the application at the server system. The application processes the updated manifest. The server system sends, to the remote physical client device, an instruction to request the additional content.

11 Claims, 10 Drawing Sheets

(51) Int. Cl.
*H04N 21/258* (2011.01)
*H04N 21/266* (2011.01)
*H04N 21/442* (2011.01)
*H04N 21/443* (2011.01)

(52) U.S. Cl.
CPC ..... *H04N 21/266* (2013.01); *H04N 21/44213* (2013.01); *H04N 21/4437* (2013.01)

(56) References Cited

U.S. PATENT DOCUMENTS

2017/0332113 A1* 11/2017 Haritaoglu ........... H04N 21/234
2019/0007715 A1* 1/2019 Navali ............. H04N 21/23655
2020/0218554 A1* 7/2020 Toksoz ................... G06F 9/485
2021/0160299 A1 5/2021 Gordon

* cited by examiner

Server 300

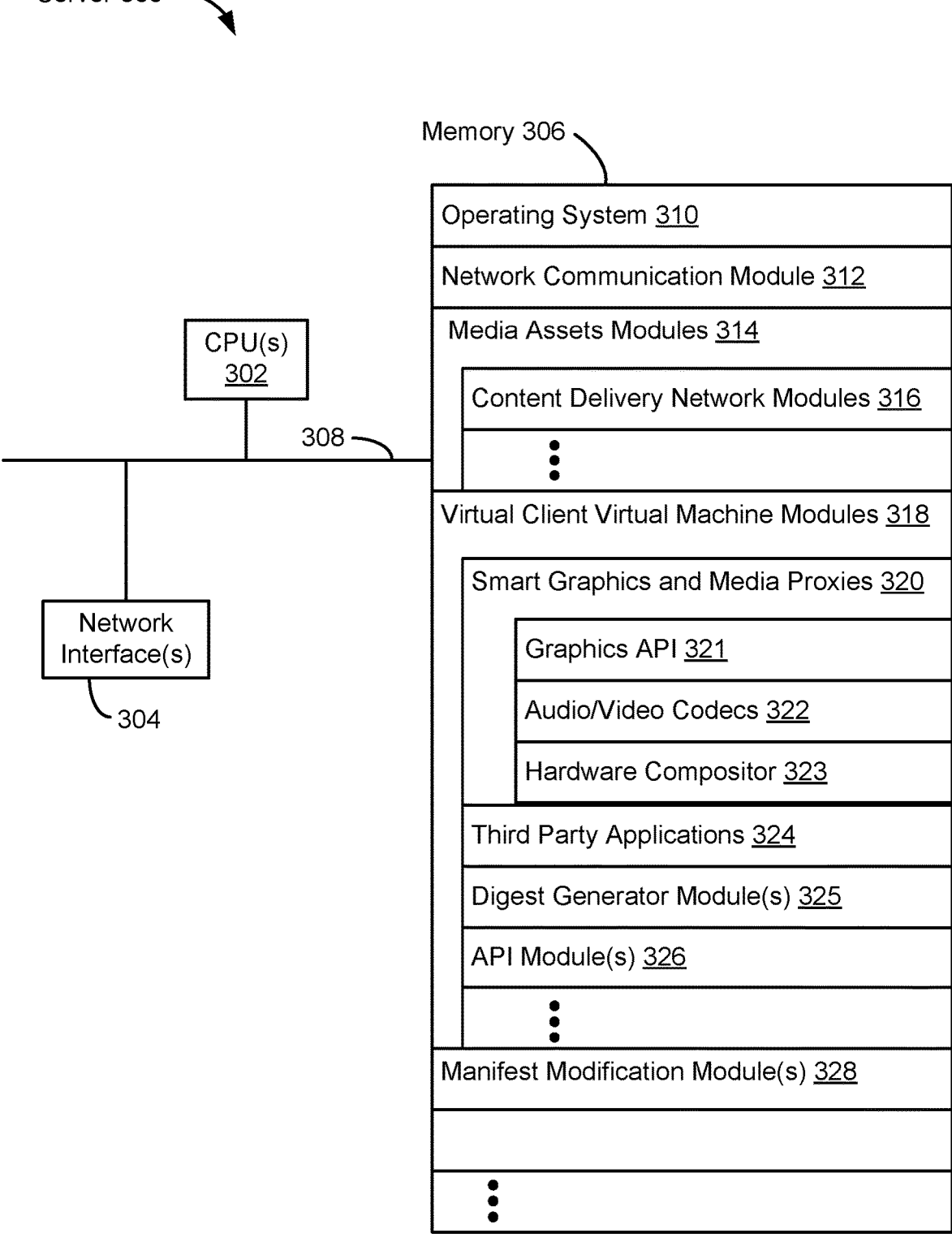

Memory 306

Operating System 310

Network Communication Module 312

Media Assets Modules 314

Content Delivery Network Modules 316

⋮

Virtual Client Virtual Machine Modules 318

Smart Graphics and Media Proxies 320

Graphics API 321

Audio/Video Codecs 322

Hardware Compositor 323

Third Party Applications 324

Digest Generator Module(s) 325

API Module(s) 326

⋮

Manifest Modification Module(s) 328

⋮

CPU(s) 302

308

Network Interface(s)

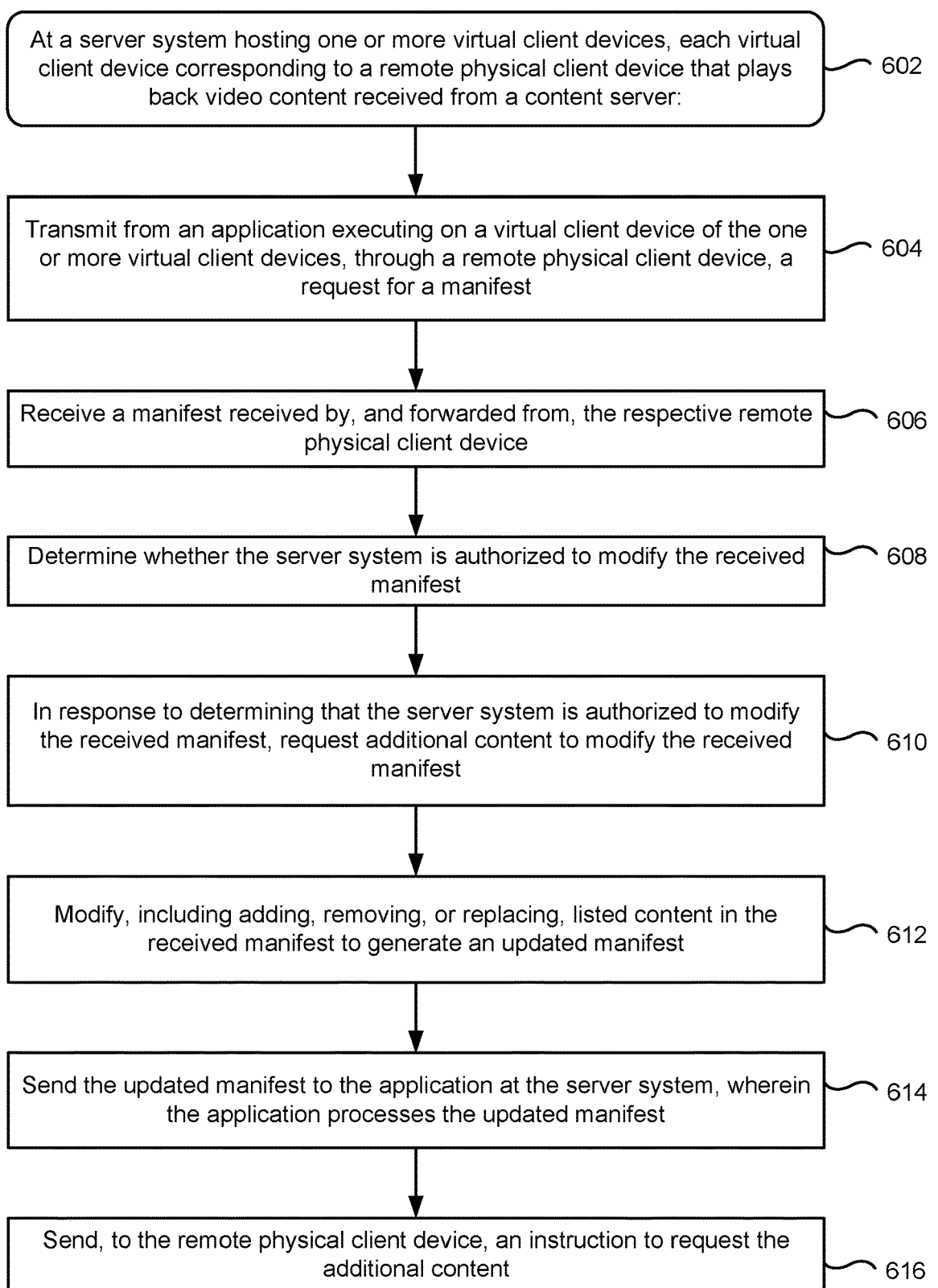

600

At a server system hosting one or more virtual client devices, each virtual client device corresponding to a remote physical client device that plays back video content received from a content server: — 602

Transmit from an application executing on a virtual client device of the one or more virtual client devices, through a remote physical client device, a request for a manifest — 604

Receive a manifest received by, and forwarded from, the respective remote physical client device — 606

Determine whether the server system is authorized to modify the received manifest — 608

In response to determining that the server system is authorized to modify the received manifest, request additional content to modify the received manifest — 610

Modify, including adding, removing, or replacing, listed content in the received manifest to generate an updated manifest — 612

Send the updated manifest to the application at the server system, wherein the application processes the updated manifest — 614

Send, to the remote physical client device, an instruction to request the additional content — 616

FIG. 6

SYSTEMS AND METHODS OF MODIFYING MANIFESTS FOR APPLICATIONS

RELATED APPLICATIONS

This Application is a United States National Stage Application filed under 35 U.S.C. § 371 of PCT Patent Application Serial No. PCT/US2022/037973, entitled "Systems and Methods of Modifying Manifests for Applications." filed on Jul. 22, 2022, which claims priority to U.S. Provisional Patent Application No. 63/225,394, entitled "Systems and Methods of Modifying Manifests for Applications," filed on Jul. 23, 2021, each of which is hereby incorporated by reference in its entirety.

This application is a related to U.S. patent application Ser. No. 16/890,957, entitled "Orchestrated Control for Displaying Media," filed on Jun. 2, 2020, which claims priority to U.S. Provisional Application No. 62/868,310, filed on Jun. 28, 2019, each of which is hereby incorporated by reference in its entirety. This application is also related to U.S. patent application Ser. No. 16/721,125, entitled "Systems and Methods of Orchestrated Networked Application Services," filed on Dec. 19, 2019, which is a continuation of International Application No. PCT/US2018/040118, filed Jun. 28, 2018, which claims priority to U.S. Provisional Application No. 62/526,954, filed Jun. 29, 2017, each of which is hereby incorporated by reference in its entirety.

FIELD OF ART

The present invention relates generally to controlling display of media by a client, and more particularly to controlling, by a server, media displayed by a client based on information received by the server from the client.

BACKGROUND

Many new interactive TV, video-on-demand (VOD) and live video services are currently becoming available from services delivered by way of the Internet. Typically, these new services interact with a common web browser on a laptop, tablet, or smartphone or require a third-party application to run a dedicated client device such as a third-party Internet set-top box or smart TV. There is a need to interact with these services while reducing reliance on specialized client devices. However, relative to a common web browser or third-party application on a laptop, tablet or smartphone, a generic legacy TV set-top has limited resources in terms of processing power, graphical capabilities and memory, and is therefore typically not able to support most of these new interactive TV and VOD services due to such limitations.

SUMMARY

Some embodiments of the present disclosure provide a virtualized application service system in which interactive TV and VOD services provided by applications running on a server. Virtualizing these interactive TV and VOD applications on the server allows thin-client devices, including legacy set-top boxes, to appear as though the interactive and VOD applications are running locally. The present disclosure provides solutions to numerous problems that arise in the context of virtualizing application services for interactive TV and VOD applications, which together improve user experience and improve the efficiency of the server-client system by reducing bandwidth and memory requirements.

Typically, a publisher of content (e.g., a content provider) selects which content to include for any given stream. For example, the content provider selects advertisements to include (and where to place the advertisements) within a media stream. By executing the VOD application associated with the content provider on the server, instead of directly on a client device, the server has an opportunity to modify content streams before instructing the client device to playback the content. For example, the server can intercept a manifest file for a stream (e.g., a first content item) and modify the manifest file to include additional content, even from other providers distinct from the content provider, before the virtualized application ingests the manifest and instructs the client device to playback the media content.

In accordance with some embodiments, a method is performed at a server system hosting one or more virtual client devices. Each virtual client device corresponds to a remote physical client device that plays back video content received from a content server. The method includes transmitting from an application executing on a virtual client device of the one or more virtual client devices, through a remote physical client device, a request for a manifest. The method includes receiving a manifest received by, and forwarded from, the remote physical client device. The method includes determining whether the server system is authorized to modify the received manifest. The method includes, in response to determining that the server system is authorized to modify the received manifest, requesting additional content to modify the received manifest. The method includes modifying, including adding, removing, or replacing, listed content in the received manifest to generate an updated manifest. The method includes sending the updated manifest to the application at the server system, wherein the application processes the updated manifest. The method includes sending, to the remote physical client device, an instruction to request the additional content.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

It will be recognized that, in various embodiments, operations described with regard to the client may apply to a server and vice versa.

BRIEF DESCRIPTION OF THE DRAWINGS

FIG. 3 is a block diagram of a server system, in accordance with some embodiments.

FIG. 6 is a flowchart for a method of modifying a manifest, in accordance with some embodiments.

DETAILED DESCRIPTION

Figure 1:
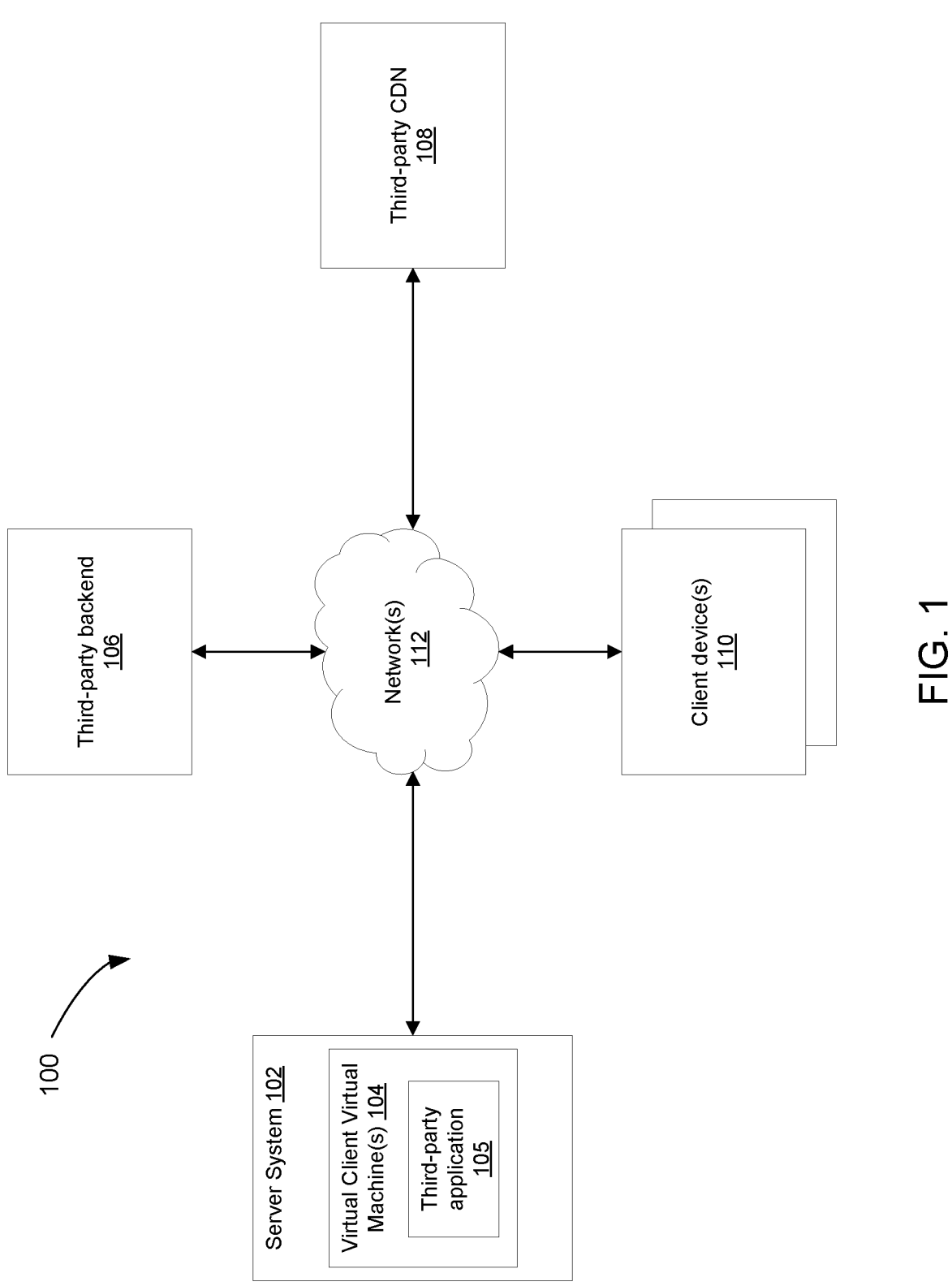
FIG. 1 is a top-level diagram illustrating a content delivery system, in accordance with some embodiments.

In accordance with some embodiments, computer systems provide an environment for third-party applications in which applications can run unmodified in a server environment in the third-party's domain (e.g., in a manner that is transparent to third-party applications that run on a client device).

Various embodiments described herein are directed to improvements of application server systems. In such systems, the user interacts with various interactive TV and VOD applications in a central facility such as a cable TV headend on a remote basis; with the user's interactions sent to the server or headend and video images, audio, and user interface graphic elements transmitted back to the user's set-top. In this way, the user perceives the application as though it were running locally inside the set-top box. This mode of operation serves applications to the user with a typically high-level of interactivity measured by the responsiveness of the overall system. This responsiveness is achieved by operating the system within the confines of the cable TV network with high-bandwidth and low-latency between the client set-top box (STB) in the home and the server system in the headend or cloud.

A super-structure that combines application services from a headend with Internet-delivered services and third-party applications is provided. In some embodiments, translations of protocols allow various client devices, including by way of example and without limitation, a legacy STB, an Internet set-top, a smart TV, a tablet, or a smartphone, to interact with—and consume content from—any source within or outside of the cable TV network. In some embodiments, the structure further operates completely apart from a cable TV network and coordinate services from the Internet at large.

In some embodiments, the applications include user interface elements rendered via a graphics API (e.g., OpenGL) with full-screen video and/or partial-screen video (e.g., managed via a video playback API such as OpenMAX and/or managed via video decoding and rendering Android APIs). The applications are meant to be ported, installed and run locally on the client device. Instead, in some embodiments, methods are provided for running the application as, or similar to, unmodified Virtual Client Virtual Machines (VCVM) (e.g., and/or as containers) running on application servers in a different domain than the client's or central facility's domain. By virtualizing the used APIs, such as OpenGL and OpenMAX, application functionality can be separated from the rendering functionality. In some embodiments, the combining of disparate elements takes place in the client device under control of a respective smart-graphics-&-media-proxy (SGMP) at the application server. For example, in the client device, video is mixed with graphics by means of a graphics API, such as OpenGL, which treats the video as a texture layer to mix appropriately with other texture layers whether graphical or full motion. This is, compared to the complexity of a full client application, a relatively simple and low resource intensive process. Hence the thinned and application independent functionality running on the client device is referred to as Thin Client.

In some embodiments, multiple applications from multiple services are combined by the system to be active concurrently for a single user and presented to the user as a single, seamlessly integrated application. For example, while a user is watching a show in a VOD application, a sports match (e.g., in which a user has indicated an interest)

begins. A Program Guide application that is provided by an application that is distinct from the VOD application (and possibly running on another server which might not be related to VOD application), temporarily displays, over the VOD application, an indication (e.g., a small overlaid notification) that the sports broadcast of interest is about to begin.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

FIG. 1 is a top-level diagram illustrating a content delivery system, in accordance with some embodiments. System 100 includes server system 102 that is hosting one or more virtual client machines (VCVM(s)) 104. Each VCVM executes one or more third-party application(s) 105. System 100 further includes third-party backend 106, third-party content distribution network (CDN) 108, and client device 110. Server system 102, third-party backend 106, third-party CDN 108, and client device 110 communicate with each other via one or more network(s) 112.

In some embodiments, a respective VCVM 104 (e.g., a Linux container) is associated with one or more client devices 110. In some embodiments, the third-party application 105 and the third-party CDN 108 are associated with the same media providing service. In some embodiments, the third-party application 105 is configured to control playback of content provided by the third party CDN 108 (e.g., the third-party application 105 is a virtualized application that would normally be execute on the client device 110). For example, the client device 110 displays content provided by third-party CDN 108 while the third-party application 105 is executing on VCVM 104. In this way, client device 110 offloads execution of the third-party application to the server system 102, reducing the processing power and/or memory required by the client device 110. As such, instead of client device 110 controlling playback of media content that is retrieved from third-party CDN 108, server system 102 controls playback by issuing playback commands to client device 110.

In some embodiments, third-party backend 106 stores third-party backend data. In some embodiments, third-party backend 106 is in communication (e.g., via network(s) 112) with the third-party application 105 that is executing on virtual client virtual machine (VCVM) 104. In some embodiments, a plurality of third-party applications 105 (e.g., each third-party application associated with a content provider) execute on a same VCVM (e.g., a user is provided access to a plurality of third-applications that are executed on VCVM 104).

In some embodiments, third-party backend 106 receives requests (e.g., from third-party application 105 executing on VCVM 104) and issues responses in accordance with third-party backend data. For example, the user selects a title from the user interface to watch, and in response to the selection, the third-party application 105 queries either the backend 106 or the CDN 108 to find out how to get the actual media content. In response to the query, third-party backend 106 performs a lookup to determine where (e.g., a directory or server) the first media content item is stored, and third-party backend 106 issues a response to the third-party application 105 that identifies where to retrieve the first media content item from the identified location of storage (e.g., at third-party CDN 108). Using this information, the third-party application 105 uses the network API to download the media content. In some embodiments third-party backend 106 receives other types of queries (e.g., queries that do not require obtaining media assets, such as to initiate or end a user session). For example, third-party backend 106 issues responses to third-party application 105 upon receiving requests for user authentication, user profile information, recently viewed content, and/or identification of content (e.g., content catalogues) that are available to the user.

In some embodiments, third-party CDN 108 stores third-party content, including media content such as video assets and/or image assets. A media asset may contain a single representation for either audio or video, or combinations of various representations of audio and video. In some embodiments, a media asset includes a single representation of audio and a single representation of video in separate assets so the third-party application can select and request a respective asset that is applicable for the current conditions (e.g., bitrate) and/or based on user preference (e.g., audio in a certain language). Each media asset (e.g., audio and/or video asset) may be subdivided in multiple segments (e.g., referred to herein as media stream segments) that can be individually and progressively downloaded from the CDN 108. In some embodiments, as explained above, the third-party backend 106 issues a response to the third-party application 105, and the third-party application 105 forwards instructions (e.g., the command) to client 110 (e.g., to retrieve the first media content item (e.g., media assets for the first media content item) from third-party CDN 108) and/or executes the command at the third-party application 105. In order for server system 102 to accurately control playback of media content at client device 110, server system 102 needs information about how much of the media asset the client device 110 has retrieved (e.g., which media stream segments the client device has retrieved) from CDN 108 (e.g., and/or current playback information regarding what the client device is currently playing back). In addition, one goal in virtualizing third-party application 105 is to avoid the need to modify third-party application 105 as compared to a version of the application that would run on client device 110. Often, applications that control presentation of video and other media content are configured to have access to the video or other media content. But, having been virtualized, it would be extremely inefficient to send the video or other media content to both the server system 102 and the client device 110 (where it is ultimately displayed).

Accordingly, in some embodiments, upon receiving a media stream segment (e.g., corresponding to a portion of the media asset from third-party CDN 108), client device 110 generates a digest of the media stream segment (e.g., a file that includes information, such as metadata, from the media stream segment, but from which video/image content from the media stream segment has been removed or discarded, as described with reference to FIG. 2) and sends the digest to server system 102. The digest includes identifying information (e.g., header information, number of frames, etc.) about the media stream segment the client device 110 retrieved from CDN 108. Thus, server system 102 (e.g., and VCVM 104) receives the identifying information in the digest, processes the identifying information to generate a reconstructed media stream (e.g., by adding dummy video data), and provides the reconstructed media stream to third-party application 105 executing on VCVM 104. Third-party application recognizes the reconstructed media stream (e.g., is "tricked" into processing the reconstructed media stream as if it were the original media stream retrieved from CDN 108), and issues a playback command to initiate playback of the media stream segment (e.g., after the application confirms that the full media stream segment has been retrieved). The command to initiate playback is transmitted from third-party application 105 to client device 110.

In response to receiving the command to initiate playback, client device 110 displays the unmodified media stream segment that was retrieved (e.g., downloaded) from CDN 108. Thus, client device 110 displays original content from CDN 108 based on a playback command controlled by the third-party application 105 executing on the server system 102. In some embodiments, third-party application 105 that is executing on the server system does not receive the original (e.g., unmodified) content from the CDN. Instead, third-party application 105 processes a segment reconstructed from the digest (e.g., a media stream segment without the video data) and issues the playback command based on the reconstructed digest. This reduces the amount of bandwidth sent between the server system and client device by allowing the client device 110 to directly download the media content from CDN 108, store the media content at the client, and send a digest (e.g., that has a smaller data size than the original media content) to the server system 102 such that the third-party application 105 executes without awareness that the VCVM 104 is separate from client device 110. Because client device 110 does not have to download or execute third-party application, client device 110 may be a "thin-client" that has limited processing power and/or memory.

Figure 2:
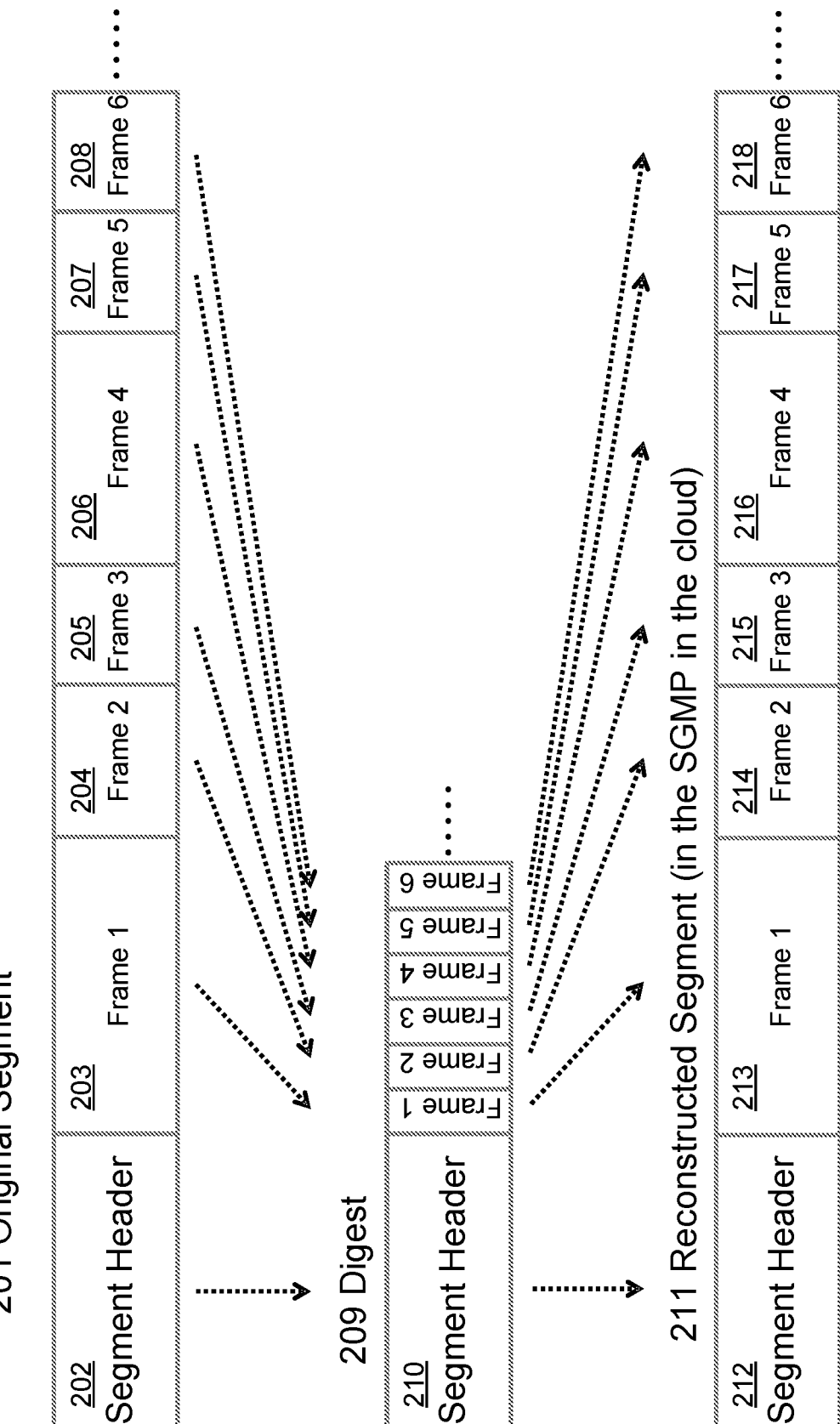
FIG. 2 is a diagram that illustrates the transformation of a video segment into a digest segment and its reconstruction into a reconstructed segment, in accordance with some embodiments.

FIG. 2 illustrates an example of generation of a digest 209 and a reconstructed segment 211. In some embodiments, a video stream comprises a plurality of media stream segments. The media stream segments are stored at CDN 108. In some embodiments, original segment 201 is obtained by client device 110. For example, client device 110 retrieves original segment 201 from the third-party CDN 108 (e.g., in response to the client receiving a command to retrieve the original segment 201).

Original Segment 201 depicts a hypothetical segment, such as an ISO base-media file-format (BMFF) segment as used in MPEG-dynamic-adaptive-streaming over HTTP (MPEG-DASH). Such a segment comprises a segment header 202 (e.g., which also corresponds to segment headers 210 and 212) and several frames, in this example, 203 to 208. It should be appreciated that the bulk of the segment data typically is the DRM-protected frame data. In some embodiments, the digest segment of the segment 209 is formed by removing the DRM-protected frame data and only including in the digest segment 209 the unmodified segment header (e.g., segment header 210 corresponds to unmodified segment header 202) and/or frame headers (such as picture headers and slice headers), including any codec specific headers, such as sequence headers, that are required to make an accurate reconstruction of the sequence of frames into reconstructed segment 211.

In some embodiments, after client device 110 receives original segment 201 (e.g., from CDN 108), the client device 110 stores the original segment (e.g., in a buffer of the client device 110). In some embodiments, the client device 110 generates digest segment 209 and sends the digest segment 209 to server system 102. The server system 102 reconstructs the digest segment 209 into reconstructed segment 211 and provides reconstructed segment 211 to third-party application 105. Upon receiving reconstructed segment 211, third-party application 105 processes the reconstructed segment 211 (e.g., as if third-party application 105 had received original segment 201) and generates a playback command (e.g., a playback command that references and/or identifies original segment 201). The server system 102 sends the playback command to client device 110. In response to receiving the playback command, client device 110 initiates playback of original segment 201. In some embodiments, this process is repeated for each media stream segment that the client retrieves from CDN 108.

In some embodiments, instead of the client device 110 generating digest segment 209, client device forwards original segment 201 to server system 102 (e.g., and/or third party CDN 108 sends original segment 201 directly to server system 102), and the server system generates digest segment 209 (e.g., and stores the digest segment 209 in a cache at the server system). Then, in some embodiments, in response to a second client device requesting playback for the same media asset, the server system 102 retrieves the digest segment for the requested media segment, reconstructs the digest segment, and provides the reconstructed segment to the third-party application 105 (e.g., that corresponds to a user session of the second client device).

FIG. 3 is a block diagram illustrating an exemplary server computer system 300 in accordance with some implementations. In some embodiments, server computer system 300 is an application server system (e.g., server system 102) that executes virtual client virtual machine 104. The server computer system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the server computer system 300 to other computing devices via one or more network interfaces 304 (wired or wireless) connected to one or more networks such as the Internet, other WANs, LANs, PANs, MANS, VPNs, peer-to-peer networks, content delivery networks, ad-hoc connections, and so on;
- one or more media assets modules 314 for enabling the server computer system 300 to perform various functions, the media assets modules 314 including, but not limited to:
  - content delivery network modules 316 for retrieving and/or processing media content received, for example, from CDN 108;
- one or more virtual client virtual machine modules 318 for executing one or more VCVM(s) 104; in some implementations, the one or more virtual client virtual machine modules 318 include:

- smart graphics and media proxies 320 for tracking graphical states of client devices and/or processing graphics content, including one or more of:
  - graphics API 321 for generating and/or sending GPU overlay instructions (e.g., openGL primitives) to a client device;
  - audio/video codecs 322 for determining and/or sending playback commands to a client device;
  - hardware compositor 323 (e.g., a virtualized hardware compositor) for generating and/or sending compositing instructions to a client device;
- third party applications 324 for execution on the VCVM(s) 104 (e.g., applications 324 include third-party applications as described above);
- digest generator module(s) 325 for generating digest segments based on media stream segments; and
- API module(s) 326 for calling and/or using APIs, including for example, a Network API and an API of the third-party application (e.g., media playback API) to process playback of the media streams and/or digest segments; and
- Manifest modification module(s) 328 for intercepting and/or modifying manifests at the server before providing the manifests to third party applications 324.

In some implementations, the server computer system 300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Although FIG. 3 illustrates the server computer system 300 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement server computer system 300, and how features are allocated among them, will vary from one implementation to another and, optionally, depends in part on the amount of data traffic that the server system handles during peak usage periods as well as during average usage periods.

Figure 4:
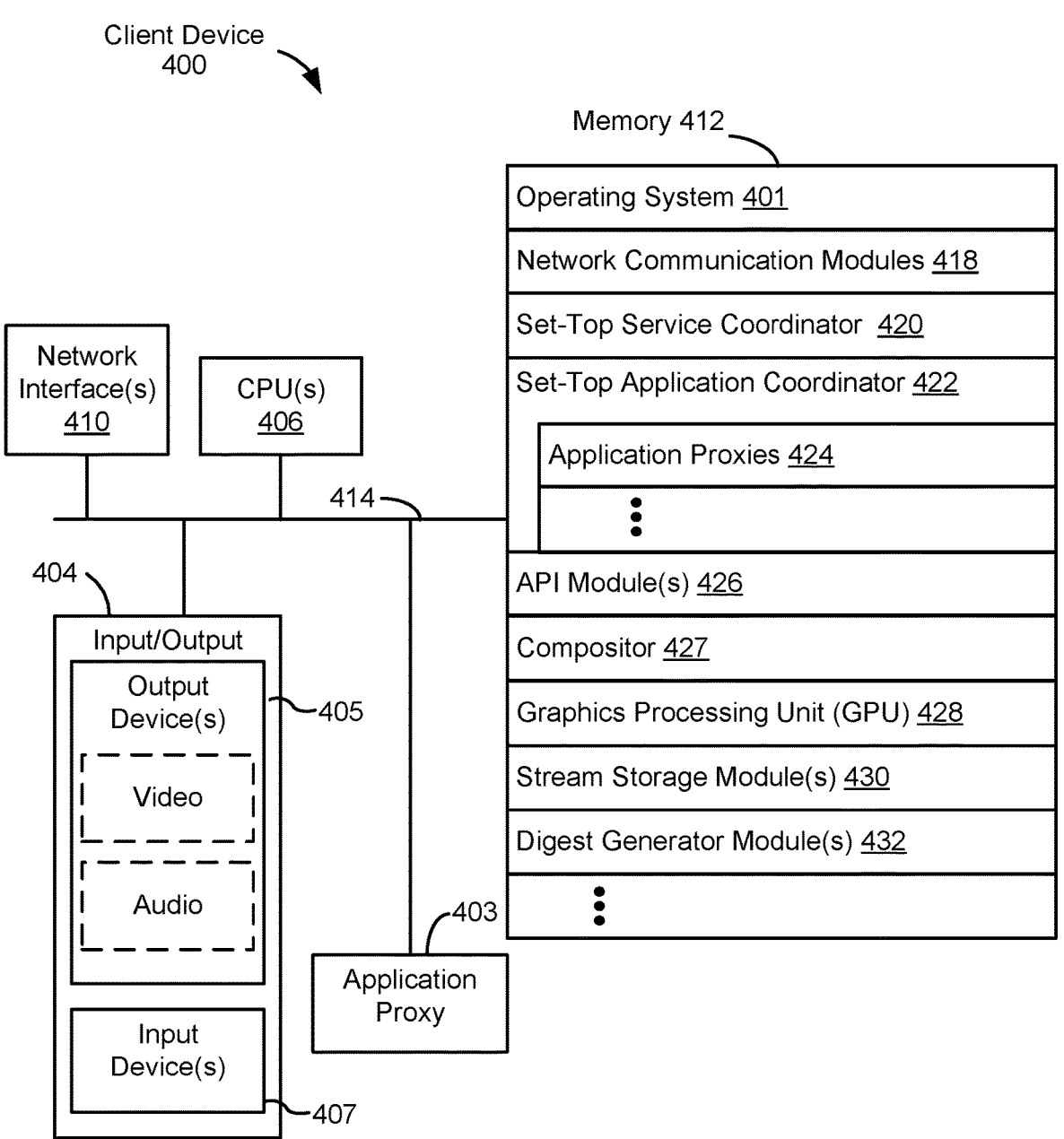
FIG. 4 is a block diagram of a client device, in accordance with some embodiments.

FIG. 4 is a block diagram illustrating an exemplary client device 400 (e.g., client device 110 of FIG. 1) in accordance with some implementations. The client device 400 typically includes one or more central processing units (CPU(s), e.g., processors or cores) 406, one or more network (or other communications) interfaces 410, memory 408, and one or more communication buses 414 for interconnecting these components. The communication buses 414 optionally include circuitry (sometimes called a chipset) that interconnects and controls communications between system components.

The client device includes input/output module 404, including output device(s) 405, such as video output and audio output, and input device(s) 407. In some implementations, the input devices 407 include a keyboard, a remote controller, or a track pad. For example, output device 405 is used for outputting video and/or audio content (e.g., to be reproduced by one or more displays and/or loudspeakers coupled with client device 400) and/or input device 407 is used for receiving user input (e.g., from a component of client device 400 (e.g., keyboard, mouse, and/or touchscreen) and/or a control coupled to client device 400 (e.g., a remote control)). Alternatively, or in addition, the client device includes (e.g., is coupled to) a display device (e.g., to display video output).

The client device includes application proxy 403 for communicating with third-party applications that are executing on the server system. For example, instead of storing and executing the application(s) on the client device, application proxy 403 receives commands (e.g., from a virtual machine in the server system) and, based on the received commands, instructs the client device to update the display accordingly.

In some implementations, the one or more network interfaces 410 include wireless and/or wired interfaces for receiving data from and/or transmitting data to other client devices 400, a server computer system 300, and/or other devices or systems. In some implementations, data communications are carried out using any of a variety of custom or standard wired protocols (e.g., USB, Firewire, Ethernet, etc.).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 406. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:

- an operating system 401 that includes procedures for handling various basic system services and for performing hardware dependent tasks;
- network communication module(s) 418 for connecting the client device 400 to other computing devices (e.g., client devices 110, server computer system 300, and/or other devices) via the one or more network interface(s) 410 (wired or wireless);
- a set-top service coordinator 420 for communicating with an operator data center, such as an orchestrator for handling content services provided to the client device (e.g., set-top box);
- a set-top application coordinator 422 for managing a plurality of third-party applications executing at the server system, the set-top application coordinator having additional module(s), including but not limited to:
    - one or more application proxies 424 for communicating (e.g., graphical states) with third-party applications;
- API Module(s) 426 for managing a variety of APIs, including, for example, OpenGL and/or OpenMAX;
- Graphics Processing Unit (GPU) 428 for rendering graphical content, including frame buffering and display control;
- stream storage module(s) 430 (e.g., including one or more buffers) for storing original media content (e.g., from CDN 108), such as storing an original segment of a video stream; and

- digest generator module(s) 432 for generating respective digest segments for respective media stream segments and sending the digest segments to the server system.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 306 and the memory 412) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 306 and the memory 412 include one or more storage devices remotely located from the CPU(s) 302 and 406. The memory 306 and the memory 412, or alternatively the non-volatile memory device(s) within these memories, comprises a non-transitory computer readable storage medium.

Figure 5A:
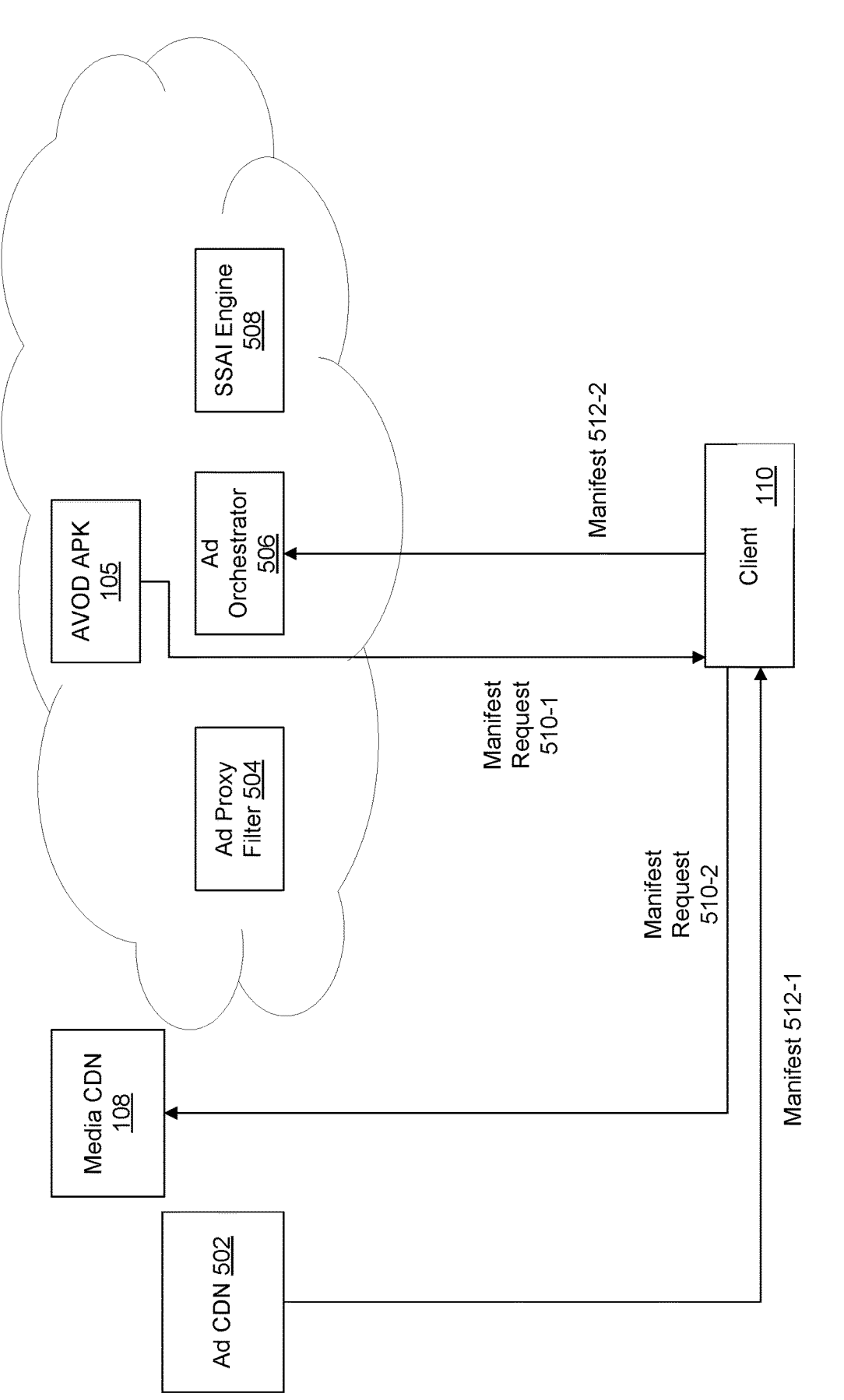
FIGS. 5A-5E are block diagrams of compositing graphical user interface overlays with video content, in accordance with some embodiments.

FIGS. 5A-5E illustrate block diagrams for modifying a manifest of a video content item before the manifest is ingested by an application executing at a virtual machine. FIG. 5A illustrates a third-party application 105 (e.g., also referred to as AVOD APK (advertising-based video on demand APK)) requesting a manifest 510-1 for a first content item. The request for the manifest 510-1 gets passed through client device 110 to the CDN 108 (e.g., manifest request 510-2). In some embodiments, the manifest is requested in response to a request (e.g., by the third-party application) generated prior to playback of the first content. For example, a user requests the first content (e.g., from the third-party application), and in response to the user request, the third-party application requests the manifest.

In response to the request for the manifest, CDN 108 sends the manifest 512-1 to the client device 110 (e.g., client device 110 fetches the manifest from CDN 108). The manifest 512-2 is then sent from the client to the server system (e.g., intended for the third-party application 105), and is intercepted by ad orchestrator 506.

In some embodiments, ad orchestrator 506 determines whether the manifest 512-2 is to be modified. For example, ad orchestrator 506 determines (e.g., based on a business rule, such as contractual or licensing terms), whether the content provider of manifest 512-2 has an agreement with one or more other content providers (e.g., advertisers or a representative of one or more advertisers) that gives the other content providers permission to insert additional content in (or otherwise alter) the manifest 512-2. In some embodiments, the orchestrator 506 makes this determination by querying a third-party service (e.g., server).

In some embodiments, ad orchestrator 506 determines candidate timestamps for placing additional content (e.g., and/or replacing or deleting content). For example, the ad orchestrator 506 (e.g., before the manifest is created) queries a third-party service to determine portions of video represented within manifest 512-2 that have logical breaks (e.g., identified by an occurrence of fade-to-black, or otherwise identified by manual identification and tagging or machine learning). In some embodiments, this process of determining candidate timestamps is performed before receiving manifest 512-2. For example, the ad orchestrator 506 tracks the content that the user is browsing and prefetches the candidate timestamps for one or more content items (e.g., before the user of client device 110 has selected content for playback and the manifest 512 is fetched). For example, the ad orchestrator operates on both in-band and out-of-band content insertion. In the case of in-band content insertion, the manifest includes indications of portions of the manifest that can be modified (e.g., to replace the identified portion with different content). For out-of-band content insertion, the ad orchestrator queries another server that provides a description of where to modify (e.g., insert, replace or delete) additional content, including properties of the portion of the manifest that can be modified, such as duration, metadata, total amount of time, amount of time for individual content items that can be included, how the amount of time is to be divided, who has the right to make the alteration decision, etc. The ad orchestrator uses these properties before querying the ad decision server 514, explained below.

Figure 5B:
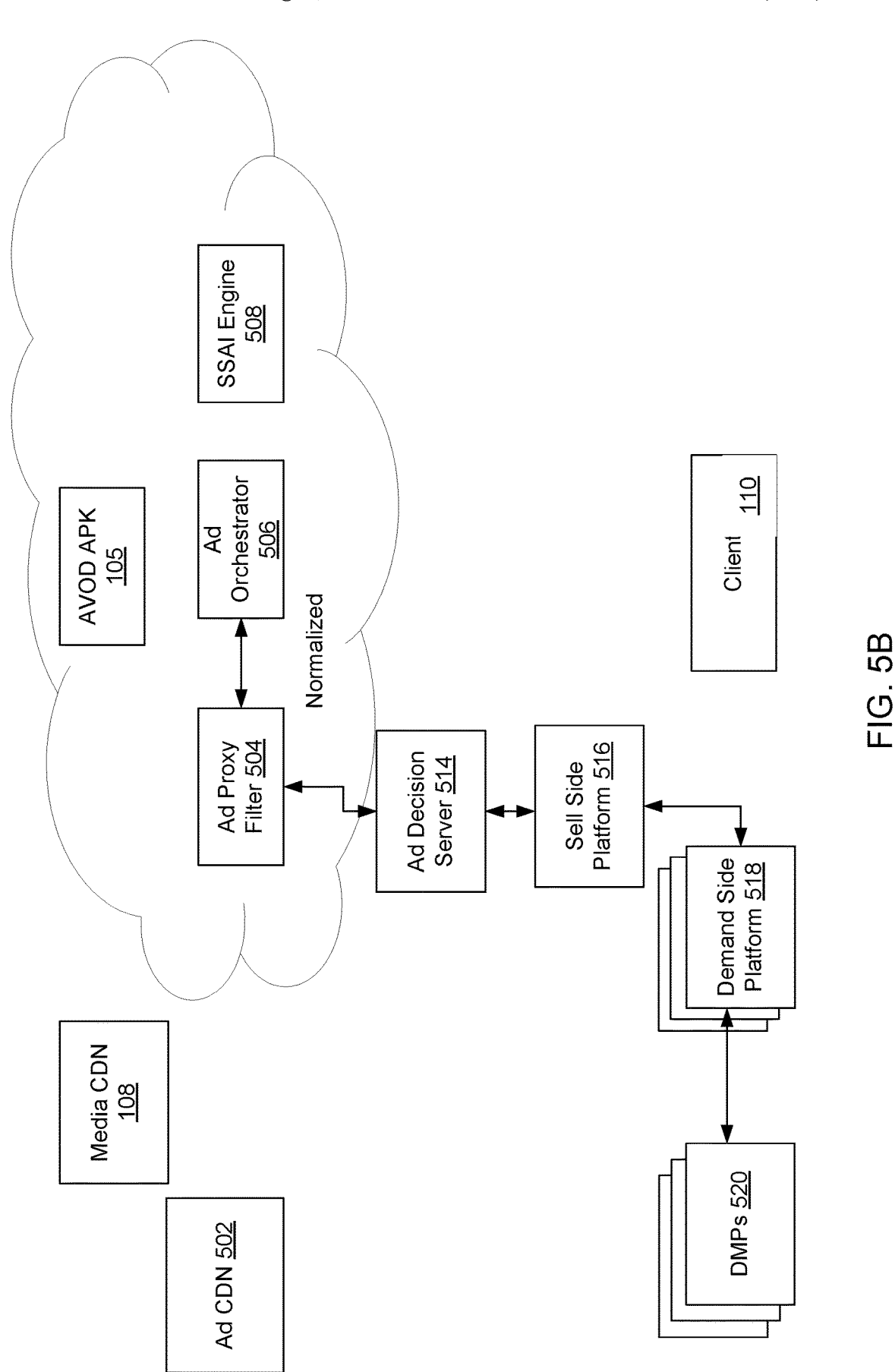

FIG. 5B illustrates ad orchestrator 506, in response to intercepting the manifest 512-2 for the first content item (and after determining, using the manifest, where additional content can be added and/or content can be modified), requesting a second content item (e.g., an advertisement) from ad proxy filter 504. In some embodiments, the second content item is to be added to the manifest 512-2, either by replacing a portion of the content identified by manifest 512-2 or by adding the second content in addition to the content included in manifest 512-2. Ad proxy filter 504 then communicates with an ad decision server 514. In some embodiments, the ad decision server 514 determines (e.g., selects) content to be presented to the user of client device 110. For example, the ad decision server 514 consults a third-party server (e.g., direct marketing platforms (DMPs)) for additional information to make the ad decision. In some embodiments, the ad proxy filter 504 normalizes the request for the second content item such that the request is in a format that can be received by the ad decision server 514.

In some embodiments, ad decision server 514 sends the requests to sell side platform 516. In some embodiments, the ad decision server 514 and/or the sell side platform 516 are owned by an operator. In some embodiments, the sell side platform 516 queries a demand side platform 518 and/or one or more direct marketing platforms (DMPs) 520. In some embodiments, the demand side platform 518 and/or the DMPs 520 are associated with a third-party (e.g., that has access to marketing data). For example, the DMPs 520 select and/or determine audience qualifiers (e.g., targeting data) based on a profile associated with client device 110 to select targeted content (e.g., advertisements) to present to client device 110. In some embodiments, the DMPs 520 are used to blind match users (e.g., the client device 110 is anonymized) with demographic or other targeting attributes specific for the user. In this way, the user data is kept private (e.g., not shared with) the DMPs, which can be controlled by a different party than the content provider(s) and operator(s). In some embodiments, the ADS 514 selects second content based on the audience qualifiers.

After the second content (e.g., advertisement) has been selected, a decision of the content is sent from the ad decision server 514 back to the ad proxy filter 504. In some embodiments, the ad proxy filter 504 normalizes the received decision to a format capable of being processed by the third-party application. For example, the decision of the content is a URL (e.g., that is inserted into the manifest) that points to where the client device 110 can retrieve the content (e.g., from a CDN or Ad CDN) when the client device 110 processes the manifest. In some embodiments, the normalized ad decisions are in a format such as IAB VAST, IAB VMAP, or vendor-proprietary format.

Figure 5C:
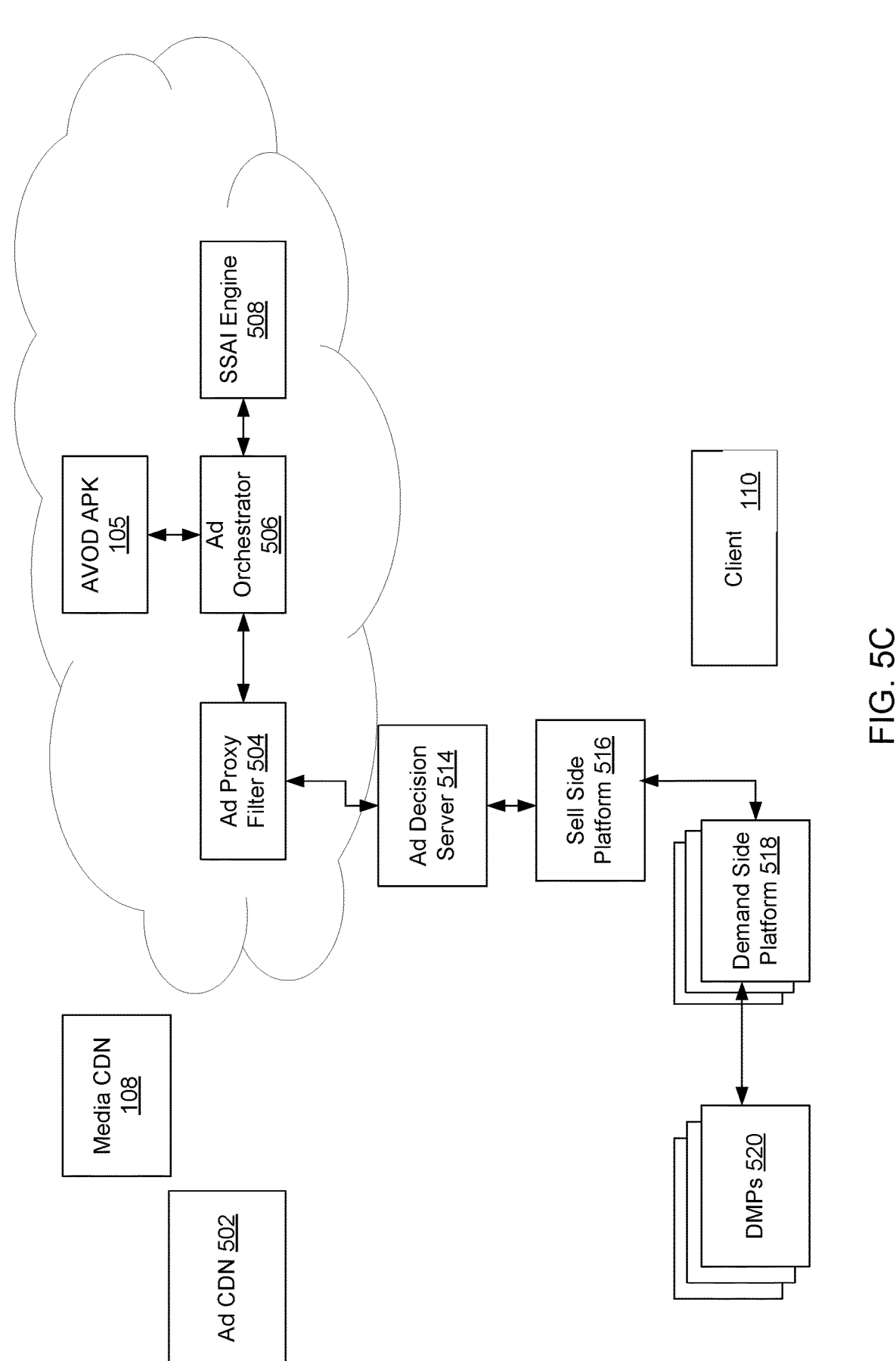

FIG. 5C illustrates that the ad orchestrator 506 receives, from ad proxy filter 504, the normalized decision of the content (e.g., URL identifying the content), and in response to the receiving the decision of the content, the ad orchestrator passes the manifest 512 (as intercepted from the client device 110) and the decision of the content to the SSAI engine 508. The SSAI engine 508 modifies the manifest 512-2 by inserting the content into the manifest 512. In some embodiments, the insertion comprises replacing a portion of the content in manifest 512-2 with the content decision (e.g., the second content) received from ad decision server 514. In some embodiments, the insertion comprises adding, at a timestamp selected from the candidate timestamps of the manifest 512-2 (e.g., determined by ad orchestrator 506, as described with reference to FIG. 5A), the second content. For example, as explained above, the predetermined timestamp may be determined by the ad orchestrator requesting, from a third party, one or more time stamps of the first content that correspond to logical breaks (e.g., to insert an ad at the logical break). It will be understood that in some embodiments, a plurality of content items are added (e.g., at different timestamps) to the manifest 512-2. For example, ad orchestrator 506 identifies a plurality of candidate timestamps and requests a plurality of additional content items to insert at the identified timestamps, wherein ad decision server 514 sends ad proxy filter a plurality of content items to be added to manifest 512-2 (e.g., inserting multiple ads into various portions of the manifest 512-2).

In some embodiments, the SSAI (server-side ad insertion) engine 508 modifies the manifest (e.g., by interleaving the second content with the first content), and sends the modified manifest 521 back to ad orchestrator 506. After receiving the updated manifest 521 (e.g., with the second content inserted), the ad orchestrator 506 sends the updated manifest to the third-party application 105 for processing. In this way, the third-party application 105 receives the updated manifest 521 that includes the second content (e.g., references to the second content, such as URLs for the second content), and processes the updated manifest 521 instead of the original manifest 512-2 received from CDN 108 via client device 110. Accordingly, the application executes the updated manifest 521 without modification to the application (e.g., the application need not determine where to insert additional content). In some embodiments, this architecture prevents a client device 110 (or third-party application 105) from having to switch between media players in order to display content that is not directly included (e.g., referenced) by the manifest.

It will be understood that the SSAI engine 508, when modifying the manifest, does not have the actual second content item (e.g., the video and/or audio of the second content item). Instead, the manifest is updated to include a reference to the second content item (e.g., a URL identifying the second content item) such that, during playback, the manifest includes the reference to the second content item and the client device 110 is enabled to retrieve the actual content of the second content item for playback at the client device 110.

Figure 5D:
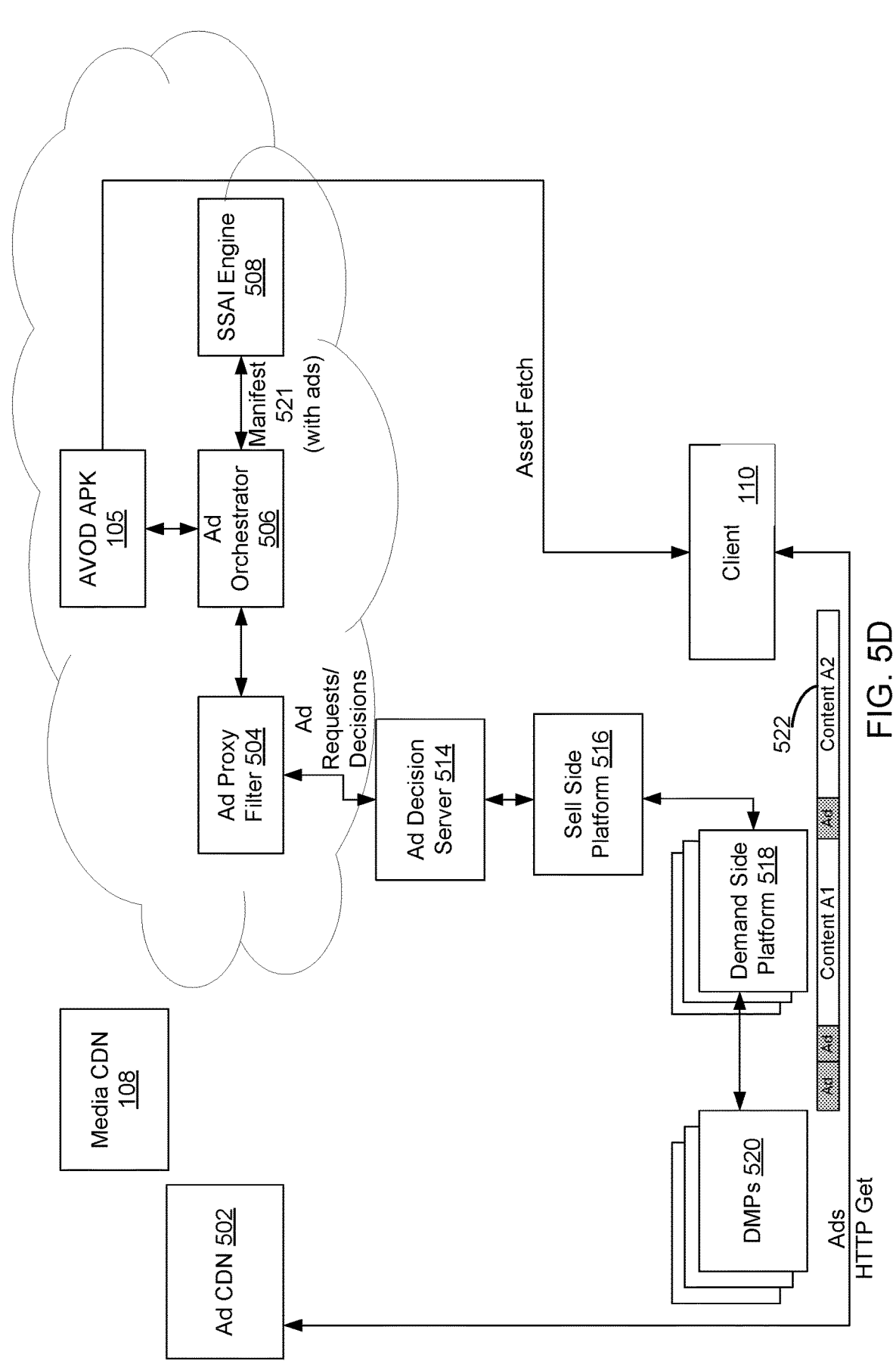

FIG. 5D illustrates the third-party application sending an instruction to client device 110 to fetch the assets identified by the manifest (e.g., the assets referenced as URLs in the updated manifest). For example, as the third-party application 105 processes the manifest, it identifies (e.g., using a URL) the content that is to be played (e.g., and the order of the content). The third-party application 105 can thus instruct the client device 110 to fetch the assets 522 for the second content from the Ad CDNs 502 (e.g., in addition to the assets for the first content to be retrieved from CDN 108). In some embodiments, the assets fetched from CDN 108 are requested by the client in response to the client device 110 receiving the original manifest 512-1, or the assets are sent to the client along with the manifest without requiring a request from the client device 110. In some embodiments, Ad CDNs 502 and CDN 108 are associated with a same party (e.g., content provider). In some embodiments, Ad CDNs 502 and CDN 108 are associated with distinct parties (e.g., distinct content providers/hosts of additional content). In response to receiving the instruction to fetch the assets, the client device 110 fetches (e.g., using an HTTP Get request) the assets from the Ad CDNs 502.

The Ad CDN 502, in response to the fetch request from the client device 110, sends the assets 522 for the second content (e.g., advertisements) to the client device 110. In some embodiments, as described above with reference to FIG. 1, the server system (e.g., the third-party application 105) sends playback commands to the client device to instruct the client device to play the content (e.g., according to the order of content chunks as identified by the updated manifest 521). The client device 110 is thus able to seamlessly play back the original content and the second content according to the updated manifest 521.

Figure 5E:
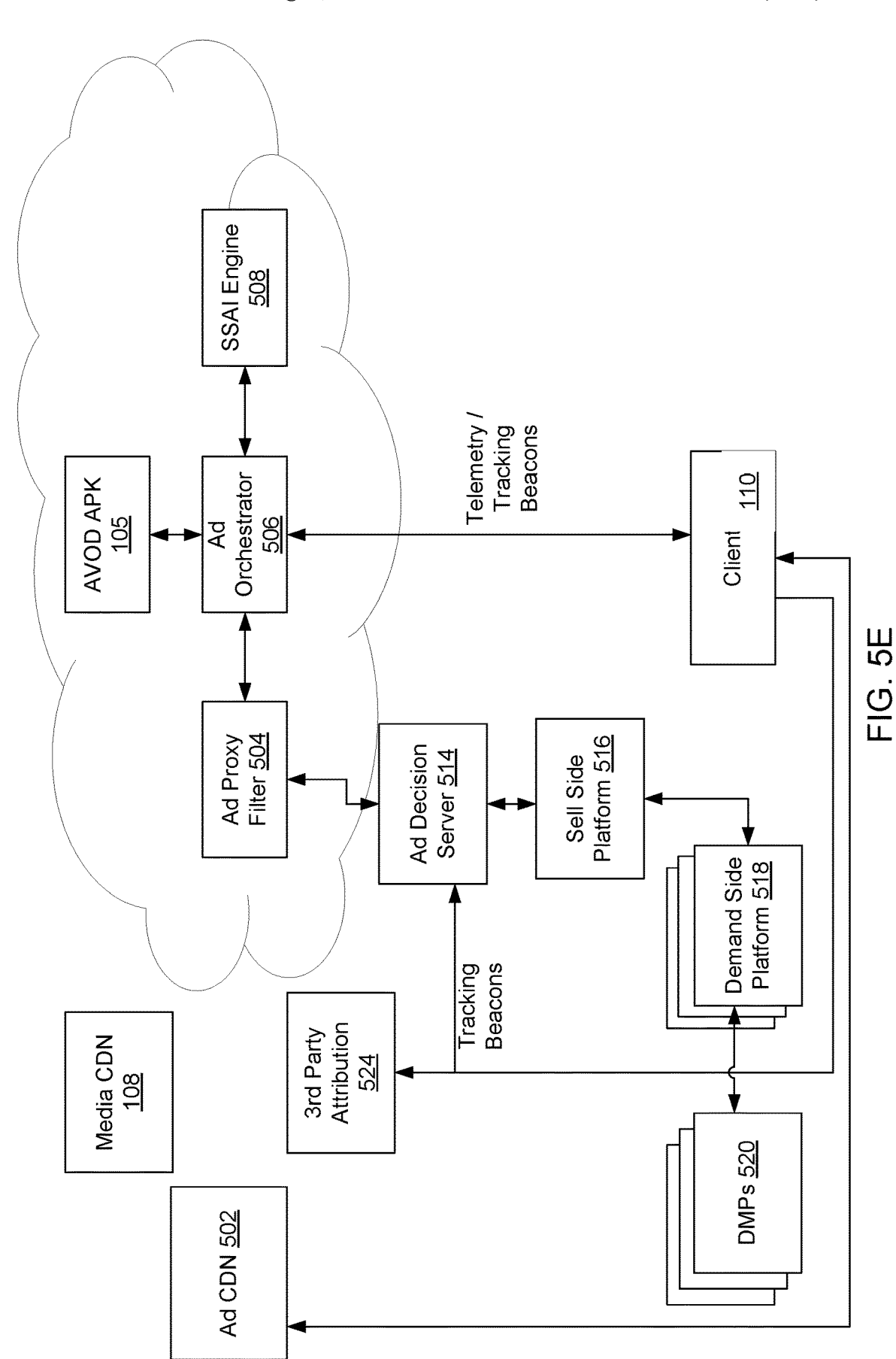

FIG. 5E illustrates the client device 110 sending playback telemetry information to the ad orchestrator 506. The ad orchestrator cross references this telemetry information with the content playback timeline and may generate tracking beacons notifying others of the playback and viewing progress which may be issued by proxy from the client device. FIG. 5E further illustrates the ad orchestrator 506 generating a tracking beacon and sending the tracking beacon to client device 110. In some embodiments, the tracking beacon is sent to client device 110 in order to notify information about the playback of the second content. For example, the tracking beacons track whether a content item was viewed, how long it was viewed, and any other information related to how the client device 110 consumed the second content. For example, in the case of the second content as advertisements, this provides information related to the consumption of the advertisements wherein the client device 110 sends the information gathered by the tracking beacons to ad decision server 514 and/or third-party attribution partners 524 (e.g., for determining effectiveness of an advertisement).

It will be understood that the process described with reference to FIGS. 5A-5E is an example of modifying a manifest for a third-party application 105 with content received from an ad decision server 514 that can also be applied to a plurality of third-party applications executing on the server and a plurality of parties that serve as the ad decision server 514. For example, because ad proxy filter 504 normalizes requests for ad decisions and normalizes the decisions (e.g., identification of content), any third-party application executing at the server is enabled to execute unmodified, because the modification of the manifest occurs using the SSAI engine 508 and ad orchestrator 506. This provides flexibility in obtaining different content from different parties (e.g., various ad decision servers) to be included in manifests for a variety of content providers with a third-party application for viewing their content. This also eliminates any dependency on each third-party application's unique method of effecting ad insertion via its proprietary internal client-side logic.

It will also be understood that, in some embodiments, the process described with reference to FIGS. 5A-5E is a continuous process even during playback of a content item.

For example, the manifest that is provided to the third-party application 105 may continuously (or periodically) be updated with a new manifest as additional content is inserted, or as playback continues.

FIG. 6 illustrates a method 600 for modifying a manifest to insert additional content. In some embodiments, the method 600 is performed by a server computer system 300 that hosts (602) one or more virtual client devices (e.g., VCVMs), each virtual client device corresponding to a remote physical client device that plays back video content received from a content server, as shown in FIG. 1. For example, instructions for performing the method are stored in the memory 306 and executed by the processor(s) 302 of the server computer system 300. Some operations described with regard to the process 600 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

In some embodiments, the server system transmits (604) from an application executing on a virtual client device of the one or more virtual client devices, through a remote physical client device, a request for a manifest. For example, the third-party application 105 at the server system transmits manifest request 510-1.

The server system receives (606) a manifest received by, and forwarded from, the remote physical client device. For example. an orchestrator of the server system intercepts a manifest forwarded from the remote physical client device. For example, ad orchestrator 506 intercepts manifest 512-2, as described with reference to FIG. 5A.

The server system determines (608) whether the server system is authorized to modify the received (e.g., intercepted) manifest. For example, the server system determines, using business rules, whether the content provider (that provides the manifest) allows a third-party to insert additional content.

In response to determining that the server system is authorized to modify the received manifest, the server system requests (610) additional content to modify the received manifest. For example, the server system requests additional content to add to the intercepted manifest. For example, as described with reference to FIG. 5B, the ad proxy filter requests, from ad decision server 514, an indication of additional content to be added to the manifest.

The server system modifies (612), including adding, removing, or replacing, listed content in the received manifest to generate an updated manifest For example, the server system adds the additional content to the manifest to generate an updated manifest. In some embodiments, the server system removes or replaces (e.g., with the additional content) existing content, such as replacing existing advertisements in the manifest. For example, as described with reference to FIG. 5C, the SSAI engine 508 modifies the manifest.

The server system sends (614) the updated manifest to the application at the server system, wherein the application processes the updated manifest. For example, as illustrated in FIG. 5C, the third-party application ingests the updated manifest.

The server system sends (616), to the remote physical client device, an instruction to request the additional content. For example, as described with reference to FIG. 5D, the third-party application 105 sends an asset fetch instruction to client device 110 to retrieve the additional content (e.g., from Ad CDNs 502).

In some embodiments, the manifest is received from a server of a first content provider. For example, the original manifest is received from Media CDN 108.

In some embodiments, the additional content is received from a server of a second content provider distinct from the first content provider, and the additional content is selected for a user associated with the virtual client device. For example, the additional content is received from Ad CDN 502, which is distinct from Media CDN 108.

In some embodiments, the server system determines a candidate timestamp of the received manifest corresponding to a timestamp to modify the listed content. For example, as described with reference to FIG. 5A, ad orchestrator 506 determines candidate timestamps for placing additional content (e.g., and/or replacing content). For example, the ad orchestrator 506 queries a third-party service to determine portions within manifest 512-2 that have logical breaks (e.g., identified by an occurrence of fade-to-black, or otherwise identified by manual identification and tagging or machine learning). In some embodiments, the candidate timestamp corresponds to a logical break in the manifest.

In some embodiments, the request for additional content to modify the received manifest is a request sent to a distinct provider that selects the content item. For example, as described with reference to FIG. 5B, ad decision server 514 determines the additional content to insert into the manifest and provides ad decisions to ad proxy filter 504 (FIG. 5D). In some embodiments, the distinct provider is associated with DMPs 520.

In some embodiments, the server system, normalizes the request for additional content to modify the received manifest into a format that is compatible with the distinct provider that selects the content item. For example, ad orchestrator 506 and/or ad proxy filter 504 normalizes the request into the proper format (e.g., ad orchestrator 506 operates on a different format of the manifest than ad decision server 514).

In some embodiments, determining whether the server system is authorized to modify the received manifest comprises querying a third-party service provider.

In some embodiments, the server system generates a tracking beacon to track playback of the additional content at the remote physical client device (e.g., as described with reference to FIG. 5E).

In some embodiments, in response to the request for additional content, the server system receives an indication of the additional content; and forwards the indication of the additional content to the remote physical client device. For example, as described with reference to FIG. 5B, the decision of the content (from ad decision server 514 to ad proxy filter 504) is a URL (e.g., that is inserted into the manifest) that points to where the client device 110 can retrieve the content (e.g., from a CDN or Ad CDN) when the client device 110 processes the manifest. As such, the client device 100 is enabled to retrieve the additional content without requiring the server system to retrieve the content.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
   at a server system hosting one or more virtual client devices, each virtual client device corresponding to a remote physical client device that plays back video content received from a content server:
   transmitting, from an application executing on a virtual client device of the one or more virtual client devices, through a remote physical client device, a request for a manifest;
   receiving a manifest received by, and forwarded from, the remote physical client device;
   determining whether the server system is authorized to modify the received manifest;
   in response to determining that the server system is authorized to modify the received manifest, requesting additional content to modify the received manifest;
   modifying, including adding, removing, or replacing, listed content in the received manifest to generate an updated manifest;
   sending the updated manifest to the application at the virtual client device, wherein the application processes the updated manifest; and
   sending, to the remote physical client device, an instruction to request the additional content.

2. The method of claim 1, wherein the manifest is received from a server of a first content provider.

3. The method of claim 2, wherein: the additional content is received from a server of a second content provider distinct from the first content provider, and the additional content is selected for a user associated with the virtual client device.

4. The method of claim 1, further comprising, determining a candidate timestamp of the received manifest corresponding to a timestamp to modify the listed content.

5. The method of claim 4, wherein the candidate timestamp corresponds to a logical break in the manifest.

6. The method of claim 5, wherein the request for additional content to modify the received manifest is a request sent to a distinct provider that selects the content item.

7. The method of claim 1, further comprising, normalizing the request for additional content to modify the received manifest into a format that is compatible with the distinct provider that selects the content item.

8. The method of claim 1, wherein determining whether the server system is authorized to modify the received manifest comprises querying a third-party service provider.

9. The method of claim 1, further comprising, generating a tracking beacon to track playback of the additional content at the remote physical client device.

10. The method of claim 1, further comprising, in response to the request for additional content, receiving an indication of the additional content; and forwarding the indication of the additional content to the remote physical client device.

11. A server system hosting one or more virtual client devices, each virtual client device corresponding to a remote physical client device that plays back video content received from a content server, the server system comprising one or more processors and memory storing one or more programs for execution by the one or more processors, the one or more programs including instructions for:

transmitting from an application executing on a virtual client device of the one or more virtual client devices, through a remote physical client device, a request for a manifest;

receiving a manifest received by, and forwarded from, the remote physical client device;

determining whether the server system is authorized to modify the received manifest;

in response to determining that the server system is authorized to modify the received manifest, requesting additional content to modify the received manifest;

modifying, including adding, removing, or replacing, listed content in the received manifest to generate an updated manifest;

sending the updated manifest to the application at the virtual client device, wherein the application processes the updated manifest; and sending, to the remote physical client device, an instruction to request the additional content.

* * * * *